United States Patent [19]
Lutz et al.

[11] Patent Number: 6,115,377
[45] Date of Patent: Sep. 5, 2000

[54] DIGITAL SYNCHRONIZATION OF MULTIPLE ASYNCHRONOUS DATA SOURCES

[75] Inventors: Norman M. Lutz, Baldwinsville; Bruce A. Link, Rochester; George A. Hadgis, Spencerport, all of N.Y.

[73] Assignee: Eastman Kodak Company, Rochester, N.Y.

[21] Appl. No.: 08/915,812

[22] Filed: Aug. 21, 1997

[51] Int. Cl.[7] .............................. H04L 25/38; H04L 12/56
[52] U.S. Cl. ........................... 370/391; 370/468; 375/370
[58] Field of Search .................................. 375/354, 372, 375/373, 374, 375; 370/391, 468

[56] References Cited

U.S. PATENT DOCUMENTS

| | | | |
|---|---|---|---|
| 4,673,285 | 6/1987 | Shogren | 355/23 |
| 5,398,241 | 3/1995 | Witchey | 370/84 |
| 5,438,435 | 8/1995 | Lawniczak | 358/496 |
| 5,583,659 | 12/1996 | Lee et al. | 3568/455 |

OTHER PUBLICATIONS

Federal Register/ vol. 64, No. 146; pp. 41392–41394, Jul. 1999.

Primary Examiner—William Luther
Attorney, Agent, or Firm—Nelson Adrian Blish

[57] ABSTRACT

A method and apparatus for digitally synchronizing data units received from multiple asynchronous data sources which includes storing the data necessary to compensate for phase and frequency differences between the independently clocked asynchronous sources. The method includes the step of comparing the input queues for each of said data streams against a set of known threshold conditions, and generating the composite output upon satisfaction of the threshold conditions. This method allows data from asynchronous data sources to be properly interleaved without implementation of complex phase or frequency compensation techniques, and without a large amount of data storage for buffering the input data. Furthermore, in its preferred embodiment, this invention allows the implementation of a fixed rate output clock, which greatly simplifies the design over the prior art.

23 Claims, 8 Drawing Sheets

DIGITAL SYNCHRONIZATION OF MULTIPLE ASYNCHRONOUS DATA SOURCES

FIELD OF THE INVENTION

The present invention relates generally to synchronizing data input from multiple asynchronous data streams. More particularly, the present invention contemplates both a method and an apparatus for processing input data received from multiple asynchronous data sources, and then creating a single common rate output data stream with the input data from the multiple sources properly interleaved.

BACKGROUND OF THE INVENTION

The present invention is directed to processes of interleaving input data from multiple asynchronous data streams into a single output data stream. Several applications require such interleaving of data, including satellite (i.e., telemetry) data and data from duplex document copying.

Figure 1:
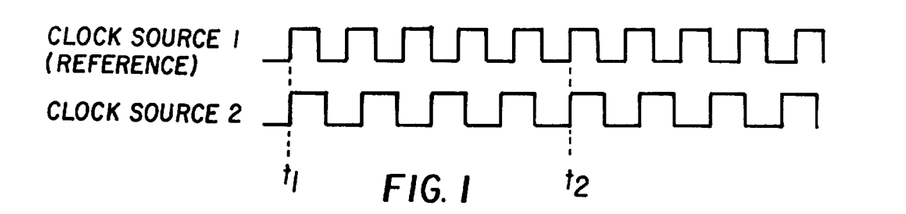
FIG. 1 shows a timing diagram of a system where clock source two is slower than the reference clock source one.
Figure 2:
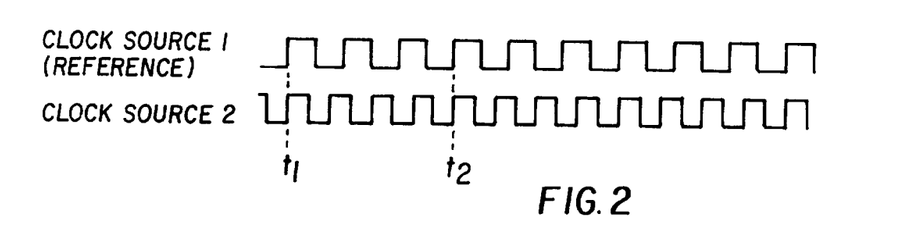
FIG. 2 shows a timing diagram of a system where clock source two is faster than the reference clock source one.

When two independent clocks are present in a system, there will always be an unknown phase relationship between the two clock sources. Furthermore, no matter what the clock sources are, there will also be a frequency difference. This frequency difference will cause the clocks to move in both time and phase relationship to each other. There are two cases to consider when analyzing this scenario as shown in FIG. 1 where Clock Source 2 is slower than Clock Source 1. The other scenario is illustrated in FIG. 2 where Clock Source 2 is faster than Clock Source 1. For discussion purposes, Clock Source 1 will be used as the reference clock source.

Although the frequency difference is overly exaggerated in FIG. 1 and FIG. 2, it can be seen from the initial coincident rising edge ($t_1$) until the next coincident rising edge ($t_2$) that there is a difference in the number of cycles that each clock goes through. The problem arises when a third system receives this data and is required to maintain a certain relationship between the data being received from both clock sources. In FIG. 1, the data stream associated with Clock Source 2 is falling behind the data stream associated with Clock Source 1. In FIG. 2 the opposite condition occurs. Thus, in any given time window there will always be a mismatch between the number of data units received and the number of data pairs which can be created. This implies that the slower clock source dominates the rate at which data pairs can be created and requires the data interleaving system to have memory to store the excess data coming from the faster data stream.

Under continuous data interleaving operation, the interleaving system would have to have an infinite memory depth because it must continuously store the faster system's excess data. However, if a finite limit can be imposed on the size of the data expected, then the interleaving system only requires a memory which is deep enough to hold the excess data which accumulates over the transmission time of the data stream. Upon completing the transmission of the frame data from both asynchronous input data streams, some idle time is required to transmit the excess data from the faster data stream. The idle time between data stream transmissions must be long enough for the interleaving system to empty the memory where the excess data has accumulated. Only when these two conditions are met, 1) finite amount of data and 2) sufficient idle time between data stream transmissions, can a system be developed to handle the interleaving of two or more asynchronous data streams.

One application of this method is described below where image data from two asynchronous image acquisition systems of a duplex scanner are to be merged. For the remainder of this disclosure, the preferred embodiment will be limited to a duplex scanner where the front and rear side images of a document are to be merged using a raster interleaving technique. The reader is reminded that pixel interleaving and document interleaving are also possible, both of which are variations of raster interleaving.

In the past, applications which required interleaving of multiple asynchronous data streams typically employed techniques which involved significant processing resources and/or significant memory resources. The asynchronous nature of the incoming data dramatically increased the complexity of the interleaving process. Typically, the methods employed required that the data streams be synchronous to one another. For example, one method might implement a master clock on one data acquisition system while the other data acquisition system is synchronized to the master via a phase locking mechanism. From a manufacturing perspective, this required that both a master and a slave data acquisition system be stocked, in addition to the phase locking implementation. This had the advantage of both increased system complexity and increased system cost. Furthermore, group delays associated with transmitting the master clock between systems would cause a skew between the data and clock of the slave system. This is especially true, and a potential limitation, at high data rates or while transmitting data over long distances.

Another scheme for merging data from multiple sources is to have a master clock at the receiver. This master clock is then transmitted to the data acquisition systems. Once again, this scheme presents a problem with group delays which would cause skew between the data and the clock, possibly limiting data rates and transmission distances. Furthermore, the clock frequency of the image acquisition systems in this scenario is dictated by the data receiver making the system less flexible.

Earlier methods of interleaving data, such as that disclosed in U.S. Pat. No. 5,398,241, "High Speed Asynchronous Multiplexer Demultiplexer," require significant amounts of data storage, and also require the use of overhead data to allow for proper synchronization of the data. Furthermore, the particular method described in U.S. Pat. No. 5,398,241 requires sophisticated and costly logic to generate a variable rate output signal. These drawbacks cause decreased efficiency of the data processing, and cause increased cost in the apparatus required to acquire and process such data.

With regard to the preferred embodiment, traditional methods of scanning and processing both sides of a two-sided document suffer from such problems as slow copying (due to the need to pass the documents through the same copying mechanism twice), or increased cost (due to having two sets of image processors in order to copy both sides.) Furthermore, none of the prior art methods involve simultaneously copying both sides of a document using only one image processing engine.

The method according to the present invention allows data from asynchronous data sources to be properly interleaved without implementation of complex phase or frequency compensation techniques (such as phase locked loops), and with a minimized amount of data storage for buffering the input data. Optimization of the data processing occurs as a result of the low overhead, and costs are reduced as a result of the reduced memory requirements over traditional approaches for this type of data acquisition.

With reference to the preferred embodiment, the current invention alleviates the need to pass a document through the copying mechanism more than once. Instead, the document passes only once through an apparatus practicing the current invention, and thus the image processing engine must only process the input data once. This results in a significant reduction in costs associated with the image processing functionality, increased reliability, lower power requirements, and a more compact design. In addition, with only a single image processing system, fewer parts need to be stocked by the various manufacturing and service organizations.

SUMMARY OF THE INVENTION

The present invention provides an improvement in the interleaving of data from multiple asynchronous sources of data. According to the present invention, only the data from a plurality of asynchronous data sources necessary to maintain a properly interleaved output stream is temporarily stored. Following storage, a merging process combines the data from each source which results in a synchronous output data stream containing the appropriately ordered data units from each input source.

In accordance with the present invention, the rate at which a particular input source provides data for temporary storage can be different from each of the other input sources, allowing for a flexible system design. Furthermore, the data rate of the interleaved output data stream need only be greater than the sum of the data rates of the multiple input data streams. The practicing of the present invention will result in more efficient data processing and reduced costs over the methods currently used for interleaving data acquired from asynchronous data sources.

Figure 8:
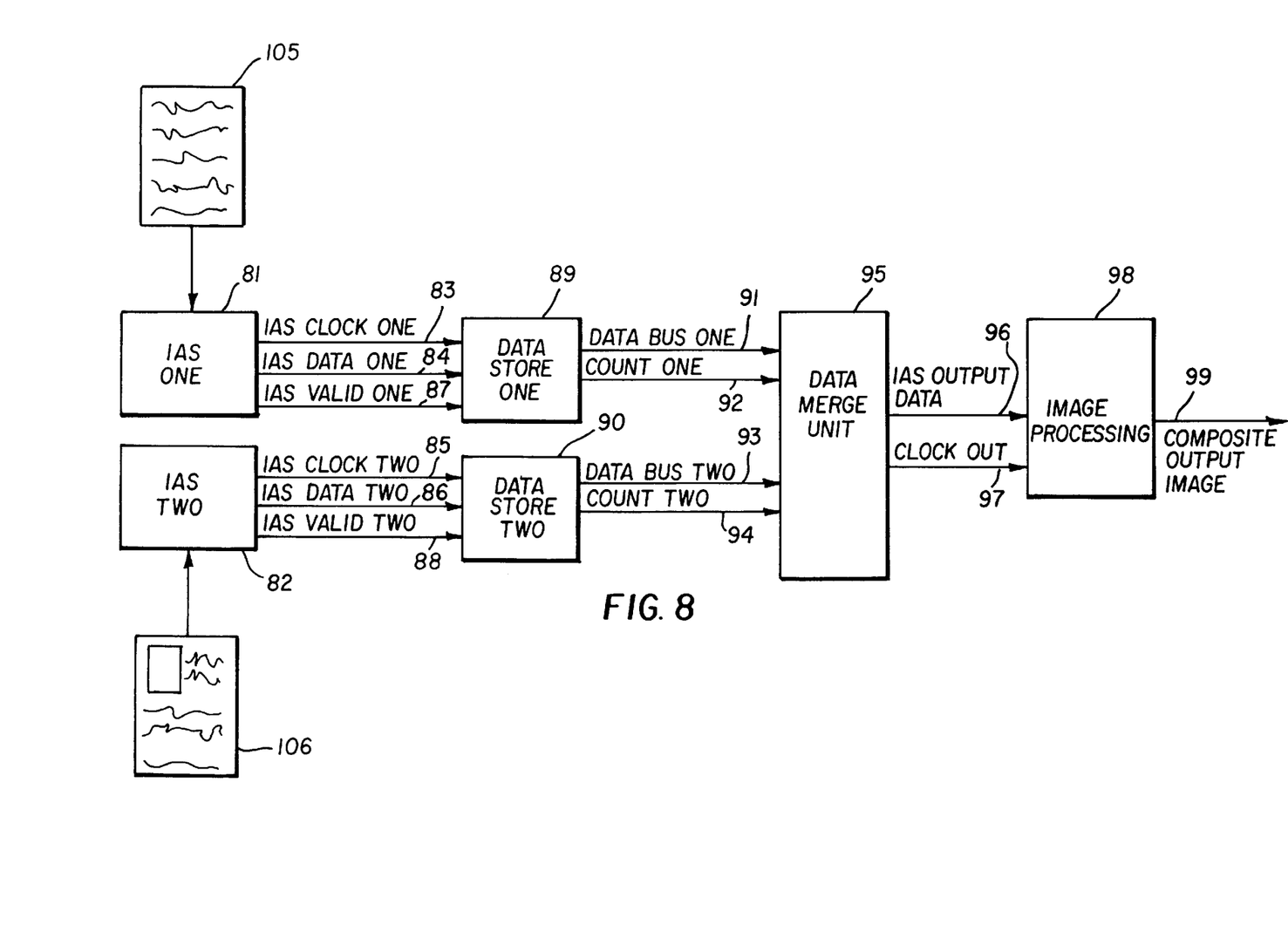
FIG. 8 depicts an apparatus for a duplex document scanning system using a single image processor according to one embodiment of the present invention.

The image merge operation of the preferred embodiment is performed by using input FIFOs to store raster data from both the front and rear image acquisition systems. The basic functional block diagram of the image merge operation is shown in FIG. 8. The preferred embodiment describes a system which is capable of acquiring image data from two image acquisition systems, each independently operating at a data rate of 10 Mbytes/sec. In practice, other data rates are also possible depending upon the product needs.

The above and other objects, advantages, and novel features according to the present invention will become more apparent from the accompanying detailed description thereof, when considered in conjunction with the following drawings wherein:

DETAILED DESCRIPTION OF THE INVENTION

Figure 3:
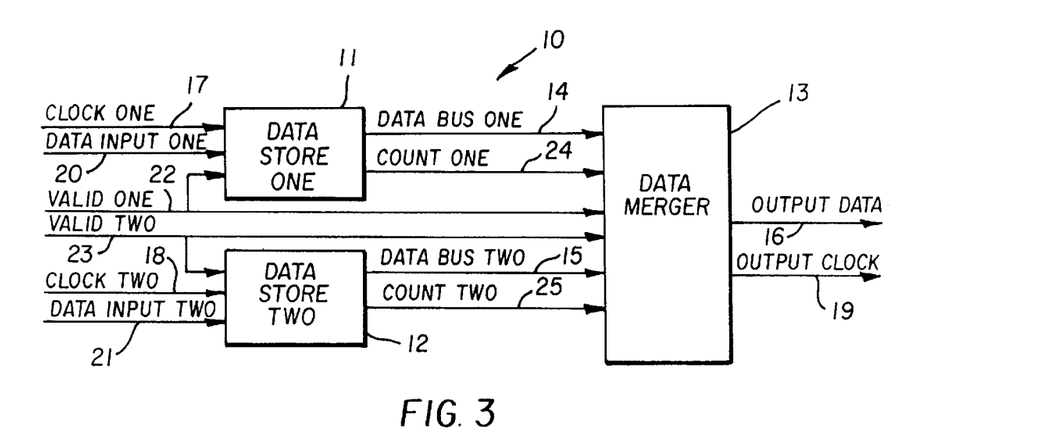
FIG. 3 depicts a high level block diagram of a system for interleaving data from a plurality of asynchronous data sources according to the present invention.

Referring now to the drawings, wherein like characters designate like or corresponding parts throughout the several views, there is shown in FIG. 3 a high level block diagram of a data processing system 10 having two independently clocked asynchronous data stores 11 and 12, and a data merger 13.

Note that while FIG. 3 contemplates only two data stores, any number of data stores could be implemented according to the present invention.

The data stores 11 and 12 provide data along the first and second data buses 14 and 15 to the data merger 13, with each data store having a separate clock. The input data for each data store can consist of any regularly clocked data unit, including but not limited to, bits, bytes, words, or collections thereof. The data stores 11 and 12 have no connections or communications between them, and thus operate totally independent of each other. In addition to the data inputs, each data store has an input clock 17 and 18, and a valid signal 22 and 23.

As noted above, the clocks 17 and 18 for each data store operate without reference to any other system clocks. According to the present invention, and in contrast to the prior art, no complicated timing information (e.g. frequency or phase information) needs to be calculated for each input channel. The data receiver simply needs to keep track of when valid data is available from the multiple data stores.

The data merger 13 receives the asynchronous input data from each source, and, according to the present invention, interleaves said input data into a single output data stream 16. This output stream of interleaved data is then synchronously clocked out of the system at the rate of the output clock 19. For maximum flexibility, according to the present invention, this clock may operate independently of any of the other input clocks in the system, with the only limitation being that the rate of the output clock must satisfy the following condition:

clock out>(clock one+clock two)

Figure 4A:
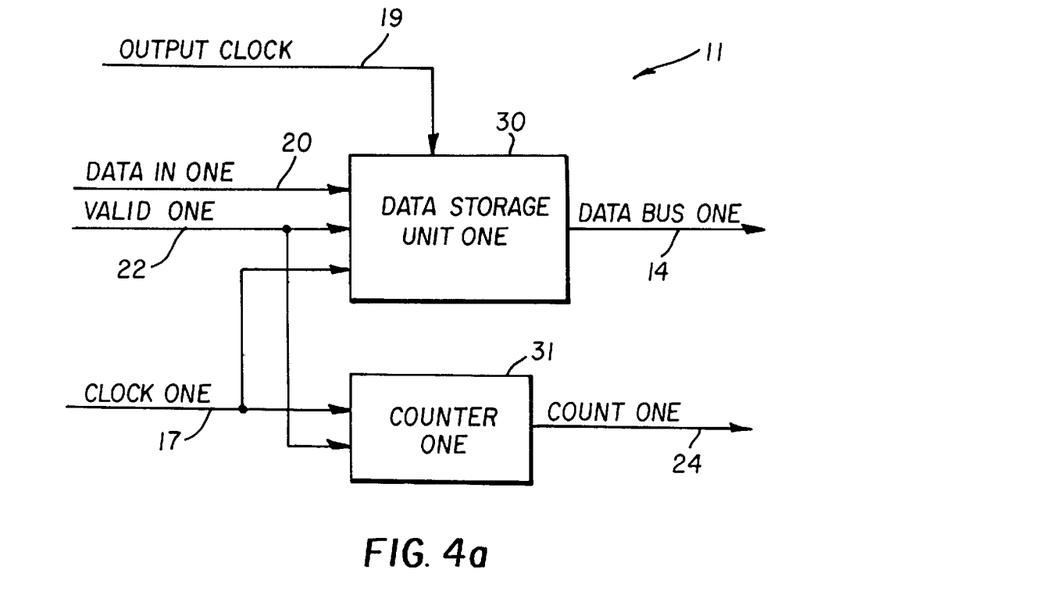
FIG. 4a depicts a detailed block diagram of data store one.
Figure 4B:
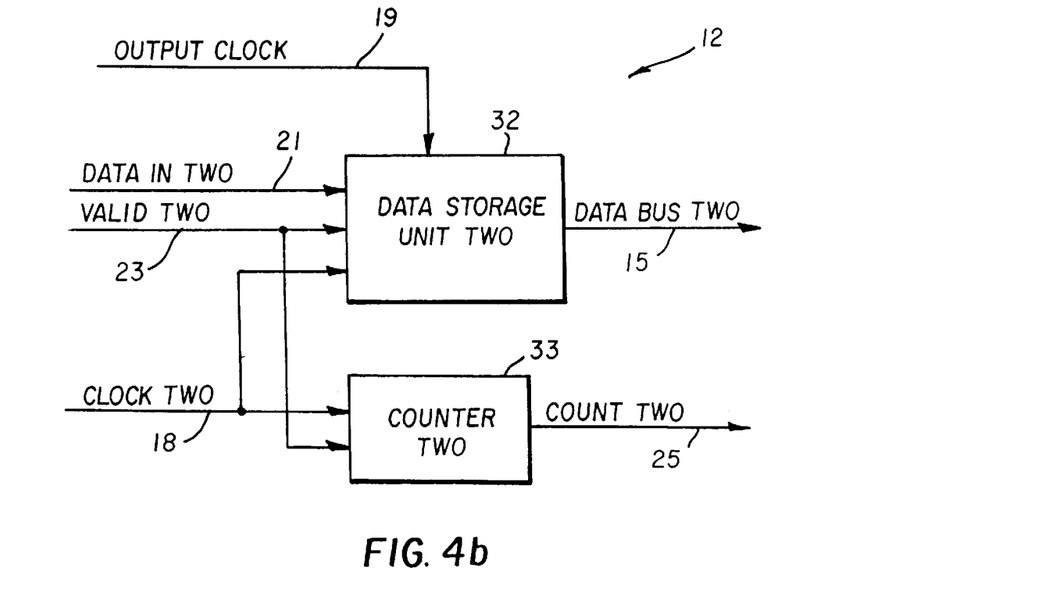
FIG. 4b depicts a detailed block diagram of data store two.

As shown in FIG. 4a and 4b, each data store consists of a data storage unit 30 and 32 and a counter 31 and 33. Data units arrive at data store one 11 at the rate of clock one 17, and at data store two 12 at the rate of clock two 18. The arrival of each data unit at data store one coincides with a clock pulse on the clock one signal line 17. The arrival of each data unit at data store two 12 coincides with a clock pulse on the clock two signal line 18. FIG. 4a illustrates data store one in detail. The data store consists of a data storage unit 30, and a counter 31. The counter 31 increments once for each clock pulse on clock one, while valid line one 22 is active, which corresponds to the arrival of a data unit on the input line 20. The output, count one 24, of counter 31 contains the value of the number of data units which have been received by the data store 30. The data store 30 stores the input data in a first-in-first-out (FIFO) manner. The output clock 19 clocks the data out of the FIFO. The rate of the output clock must meet the following condition:

clock out>(clock one+clock two) in order for the output clock to keep up with the input data.

Figure 5:
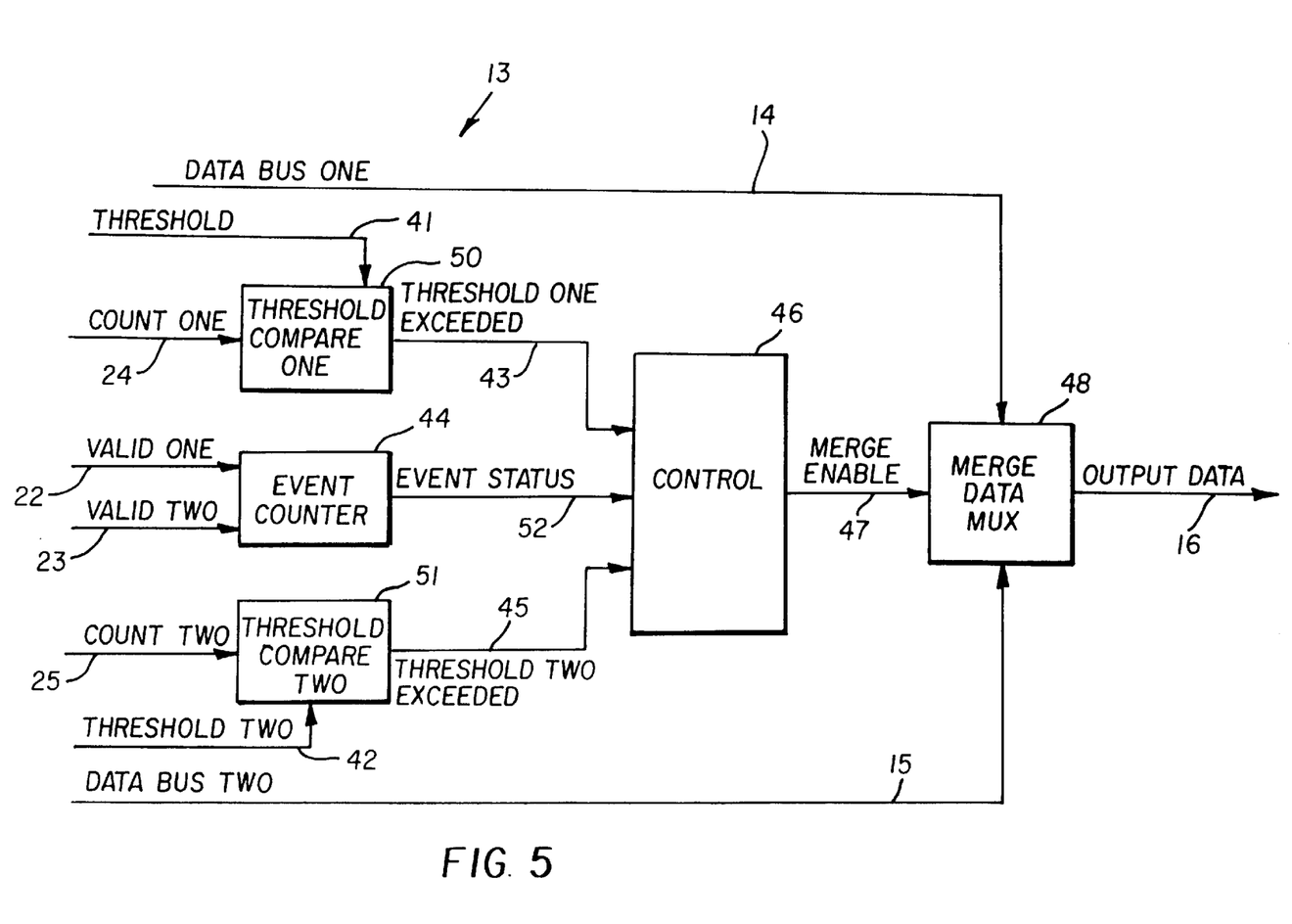
FIG. 5 depicts a detailed block diagram of the data merger.

As shown in FIG. 5, the threshold compare mechanisms 50 and 51 compare the counter values 24 and 25 from the data inputs to predetermined threshold values 41 and 42 within the system. If a counter has exceeded the threshold value, the system asserts the appropriate threshold exceeded line 43 or 45, and a state change occurs within the control logic 46 in response. This indicates to the control logic 46 that the data store which has exceeded the threshold value has data available for the merge operation.

Also as shown in FIG. 5, the event counter 44 monitors valid line one 22 and valid line two 23. According to one embodiment of the present invention, the event counter 44 can both be incremented and decremented. It increments upon assertion of the valid line one 22 and decrements upon assertion of the valid line two 23. At initialization, the system loads the event counter 44 with a midpoint value. This value serves as an initialization value, to which the control logic 46 can then later compare the actual value of the event counter. If the event counter value is greater than the midpoint initialization value, data store one has completed acquisition of at least one more raster than data store two.

Similarly, if the event counter value is less than the midpoint initialization value, data store two has completed acquisition of at least one more raster than data store one.

The event counter 44 provides an event status 52 to the control logic 46. The control logic 46 controls the operation of the merge data multiplexer (MUX) 48. In particular, the control logic 46 monitors the conditions of the threshold exceeded signals 43 and 45, and the event status 52. When the proper conditions have been met, the control logic enables the data merge operation by asserting the merge enable signal 47.

Figure 6:
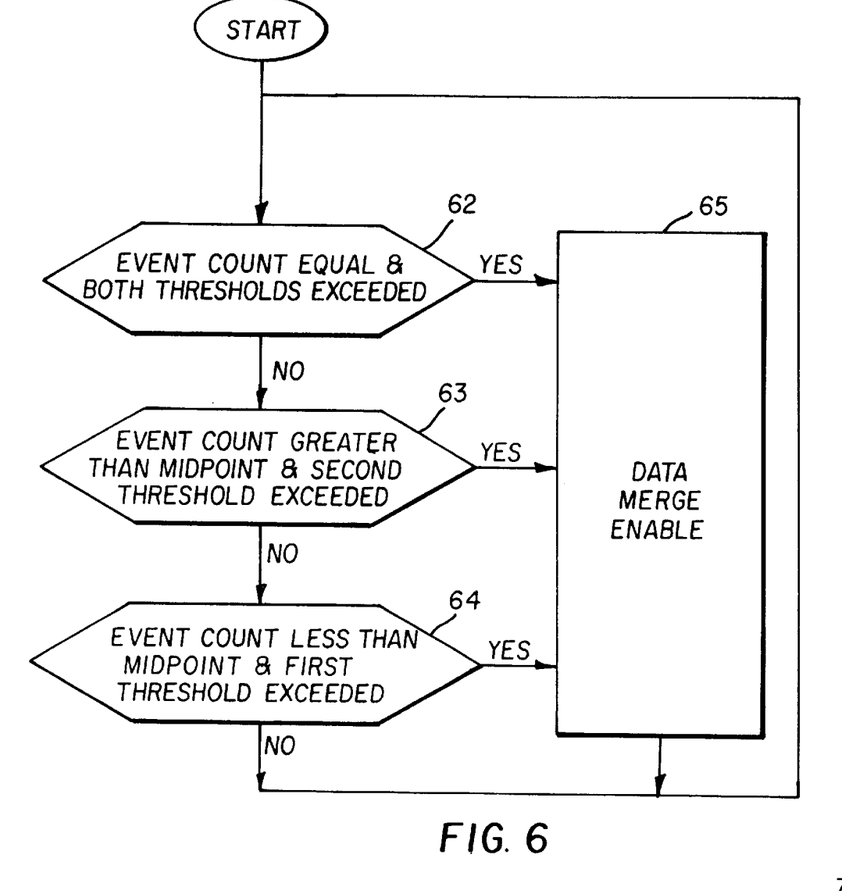
FIG. 6 details the operation of the control logic in the form of a flow chart.

FIG. 6 shows the operation of the control logic 46 in one embodiment of the present invention with two data sources. The three condition checks 62, 63, and 64 all determine when data from the data sources will be merged. The first condition checks if both of the data input thresholds have been exceeded. If so, and the event counter indicates that both data sources are on the same raster, the data merge enable 65 allows the data from the input sources to be merged.

If both of the data input thresholds have not been exceeded, the second condition check 63 determines whether the first data source has data buffered up to be merged. The event status 52 indicates this condition by having a value greater than the midpoint value, which will occur when data source one causes the counter to increment and data source two has not yet completed a raster to cause the counter to decrement back to the midpoint value. If the event counter is greater than the midpoint value and the threshold two exceeded signal 45 has been asserted, the data merge enable 65 allows the data from the input sources to be merged.

In a similar manner, the third condition check 64 determines whether the second data source has data buffered up to be merged. The event status 52 indicates this condition by having a value less than the midpoint value, which will occur when data source two causes the counter to decrement and data source one has not yet completed a raster to cause the counter to increment back to the midpoint value. If the event status 52 is less than the midpoint value and the threshold one exceeded signal 43 has been asserted, the data merge enable 65 allows the data from the input sources to be merged.

In duplex document scanning applications such as that described in the patent application submitted concurrently entitled "A Duplex Scanner Utilizing a Single Image Processor", it is desirable to merge both front and rear document image acquisition system outputs into a single composite image. In the preferred embodiment, it is further desirable to merge the outputs of two image acquisition systems which are asynchronous to one another. Generally speaking, the image data from the two asynchronous data streams could be interleaved in one of three possible ways, 1) pixel interleaving where each pixel could be n-bits wide, 2) raster interleaving where a raster is comprised of several n-bit bytes, and 3) document interleaving where a document is comprised of several rasters.

The preferred embodiment involves implementation of a raster interleaving technique. In this case, image data is received in packets called rasters from the image acquisition systems (IAS) at 10 MHz. This data is synchronized according to the method of the present invention using input FIFOs, and is then sequenced into a composite raster comprised of both front and rear rasters interleaved. The raster data is output according to the equation for clock out, above. The output clock would be greater than 20 MHz in this particular instance since there is twice the amount of data that must be processed in the same amount of time. The purpose of such an approach is to implement a single image processor as described in concurrently submitted concept disclosure entitled "A Duplex Scanner Utilizing a Single Image Processor".

Figure 7A:
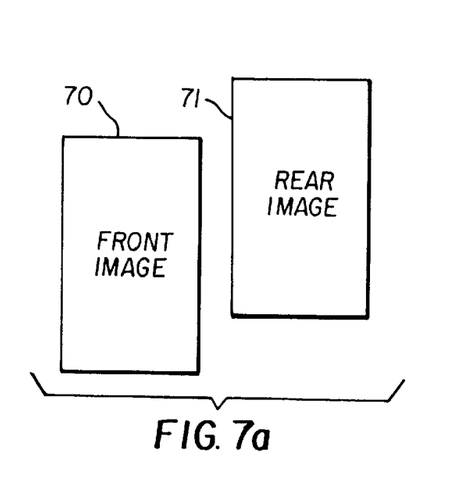
FIG. 7 illustrates a composite image which results when the method according to the present invention is applied to the process of duplex document reproduction.
Figure 7B:
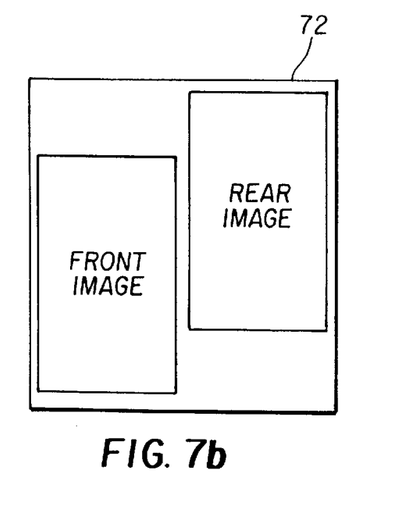

FIG. 7a shows the input in the preferred embodiment of the present invention. It consists of a front image 70 and a rear image 71 from an image acquisition process. FIG. 7b shows the output from the process described above in a preferred embodiment of the present invention. It consists of a single composite image 72 consisting of the front image 70 and the rear image 71 captured on a single page. In producing the composite image 72, the front image 70 and rear image 71 were captured and their output was merged according to a preferred embodiment of the present invention.

FIG. 8 shows a block diagram of the preferred embodiment of the present invention, consisting of a first image acquisition system (IAS) 81 and a second image acquisition system 82. According to the present invention, IAS one 81 receives image one 105 from one side of a two-sided document and IAS two 82 receives image two 106 from the other side of the two-sided document. IAS one 81 produces the image data on IAS data one 84 according to IAS valid one 87 and at the rate of IAS clock one 83. Similarly, IAS two 82 produces the image data on IAS data two 86 according to IAS valid two 88 and at the rate of IAS clock two 85. The two output streams on data bus one 91 and data bus two 93 are merged according to the present invention by the data merge unit 95, which uses count one 92 and count two 94 to maintain synchronization between the two data streams.

The data merge unit 95 produces the IAS output data 96 and clock out 97. The IAS output data 96 can then be processed by a single image processing system 98, which produces the composite output image data stream 99.

Data is written into data store one 89 and data store two 90 (containing the front and rear FIFOs, respectively) at 10 Mbytes/sec and read out at rate greater than 20 Mbytes/sec. However because the two FIFO write clocks are asynchronous to each other, a Phase Skew and Difference Frequency exists between the front and rear FIFO fill rates. This would make the merge logic very complex and would also require the input FIFOs to have additional memory storage to handle the data requirements imposed by the effects of the Phase Skew and Difference Frequency ($f_{diff}$).

Figure 9:
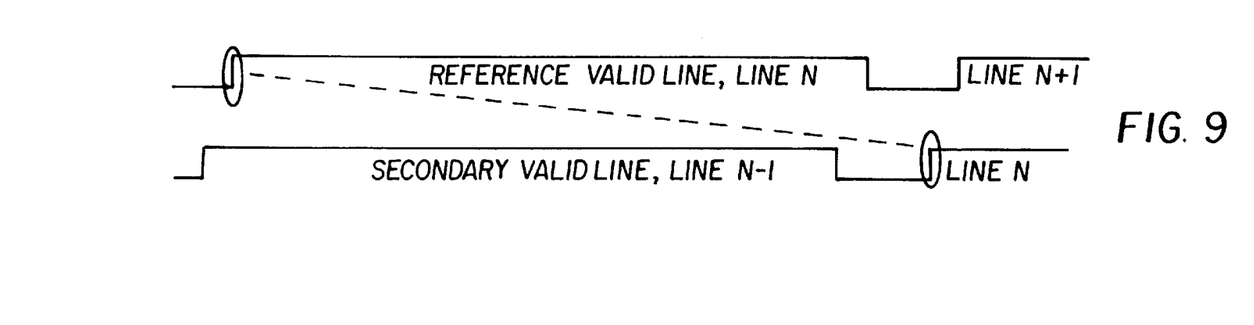
FIG. 9 shows matching rising edges on the Valid Lines of the reference and secondary systems, where the rising edge on the Valid Line of the secondary system lags the rising edge on the reference system by almost one full cycle time.

The clock phase skew translates into a Valid Line phase skew as shown in FIG. 9. This skew of the Valid Line signal imposes the reservation of one line of storage in the input FIFOs to handle this case, where one line is defined as the number of pixels contained in one complete raster of the image. In a data merge operation one Valid Line must be selected as the reference Valid Line. The reference Valid Line will be used to start the merge operation but, as shown in FIG. 9, the secondary Valid Line may be nearly an entire line time out of phase with the reference. In this case, the reference input FIFO must store one entire line of input data while the IAS data merger waits for the secondary input FIFO to fill up with its' first valid line of data. Which Valid Line, front or rear, is selected as the reference has no effect on the additional FIFO memory requirement imposed by the line skew.

Besides having additional memory requirements because of the Phase Skew, there is also data accumulating over an image frame time as a consequence of the Difference Frequency that exists between the two asynchronous clock sources. The Difference Frequency exists because any two clock sources, no matter how ideal, will always have some variance between them unless one is phase locked to the other. To find the additional memory requirements imposed by the Difference Frequency, a detailed analysis of the Difference Frequency must be done.

The maximum Difference Frequency that exists between the front and rear image acquisition systems clocks occurs when one oscillator is at its maximum frequency and the other is at its minimum frequency. This definition yields the following equation for Difference Frequency ($f_{diff}$):

$$f_{diff} = f_{max} - f_{min} \quad \text{EQ. 1}$$

The oscillator frequency chosen for this example has a nominal operating point of 10 MHz with a +/−100 PPM stability. Using EQ. 1 defined above, the maximum Difference Frequency between the two image acquisition systems is:

$$f_{diff} = 10,001,000 - 9,999,000 = 2,000 \text{ Hz}.$$

Once the Difference Frequency is found, the rate at which the two image acquisition systems clocks slip in relationship to each other must be found. This corresponds to the Slip Count, which is the number of clock cycles of the reference clock in which an extra data unit will be accumulated due to the Difference Frequency. The Slip Count is found by determining the number of oscillator cycles in the Difference Frequency which can be expressed with the following equation:

$$\text{Slip Count} = f_{max}/f_{diff} \quad \text{EQ. 2}$$

Using EQ. 2, the Slip Count is:

$$\text{Slip Count} = 10,001,000/2,000 \text{ Hz} = 5,000.5$$

The Slip Count example above tells us that for every 5,000.5 clock cycles there will be a cycle of slippage between the front and rear image acquisition systems which means that one FIFO will accumulate an extra pixel of data. This can be verified by taking the minimum oscillator frequency period times the Slip Count minus the maximum oscillator frequency period times the Slip Count.

An example will be done here using the image acquisition systems to illustrate the concept. The nominal oscillator frequency for the image acquisition systems is 10 MHz with a +/−100 PPM stability which yields the following verification results shown in Table 1.

TABLE 1

Slippage Verification Results Case 1

| Calculations | Time |
| --- | --- |
| $1/f_{min}$* Slip Count= | 500.100010001... |
| 1/(9,990,000) * 5,000.5= | μsec |
| $1/f_{max}$* Slip Count= | 500 μsec |
| 1/(10,001,000) * 5,000.5= | |
| Slippage time = | 100.010001... nsec |
| 500.100010001... μsec − 500 μsec = | |
| Clock period of minimum clock = | 100.010001... nsec |
| 1/9,999,000 = | |

From Table 1, it has been shown that under worst case conditions in the preferred embodiment of the present invention, there will be one additional pixel in the faster input FIFOs memory every 5,000.5 clock cycles. To find out how much additional memory is required to handle these additional pixels, the total number of pixels in an image frame must be determined. The basic equation for calculating the total number of pixels in an image frame is:

$$\text{Image Frame Size} = \text{Scan Width} * \text{Resolution}^2 * [\text{Document length} + \text{IAS offset}] \quad \text{EQ. 3}$$

where the IAS offset is equal to the physical separation of the two focal points for each IAS system.

Once the total number of pixels per image frame is known, the number of additional pixels generated by the faster clock can be found by dividing the image frame size by the Slip Count which yields the following equation:

$$\text{Additional Pixels} = \text{Image Frame Size}/\text{Slip Count}. \quad \text{EQ. 4}$$

The system described in this document has 3,650 pixels per line at 300 DPI. Using EQ. 3 and EQ. 4 defined above, the total number of additional pixels for a 12" wide by 26" long document with a 1" IAS offset can be calculated as follows:

$$\text{Additional Pixels} = (12 * 300^2 * [26+1])/5,000.5 = 5,832 \text{ pixels}.$$

In addition to the two additional memory requirements already discussed, there is one more additional memory requirement imposed on the input FIFOs by the IAS data merger itself. In FIG. 8, the data merge unit 95 cannot start reading data from the reference FIFO until the secondary FIFO is at least ⅓ full or more. If the IAS data merger starts reading from the reference FIFO and then switches to the secondary FIFO there must be enough data in the secondary FIFO to support reading until the end of line. If the secondary FIFO did not have enough data in it to support a full line read then the merged output data stream would be discontinuous. A discontinuous data stream would prevent the IAS data merger from generating a correctly delayed Valid Line output.

Using the three additional memory requirements discussed, a Total Additional Memory Requirement (TAMR) can be found by adding up all the individual requirements yielding the following equation:

TAMR=Line+Additional Pixels+⅓*Line.   EQ. 5

Now using EQ. 5, the Total Additional Memory Requirement (TAMR) for the input FIFOs can be determined for the 26" input document with a 1" IAS offset:

TAMR=3,650+5,832+⅓*3,650=10,699 pixels.

From the calculation listed above, 10,699 pixels would have to be stored to support a 26" document under worst case conditions.

Figure 10:
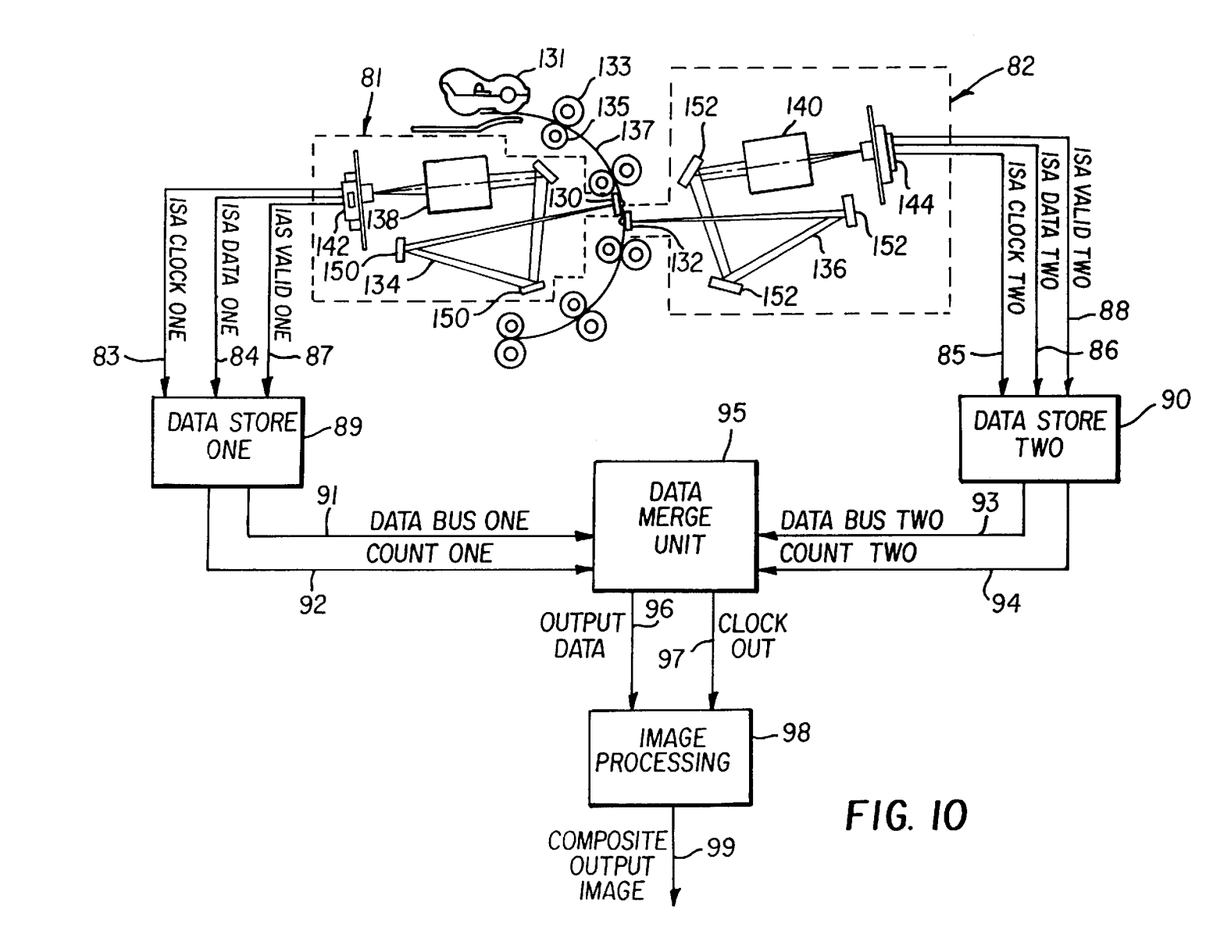
FIG. 10 depicts a detailed view of the apparatus used to simultaneously acquire two channels of asynchronous image data from a two sided document and then combine those data streams into a single output data stream according to the present invention.

FIG. 10 shows a detailed view of the preferred embodiment of the apparatus depicted by the block diagram shown in FIG. 8. It consists of IAS One 81 and IAS Two 82. Each IAS includes an aperture 130 and 132. The document feeder module 131 advances the document to be scanned through the transport driver 133 and transport idler 135 along paper path 137. As the document continues along paper path 137, it passes the apertures 130 and 132 which simultaneously scan both sides of the document.

For IAS One 81, the scanned image proceeds along image path 134, and is reflected by mirrors 150 through the lens assembly 138. The lens assembly 138 focuses the scanned document image into the camera/CCD module 142. This produces the raster data stream on IAS data one 84, which is clocked into the data one store 89 according to IAS clock one 83 and IAS valid one 87. The identical sequence of events occurs for IAS Two 82, which produces the raster data stream along IAS data two 86. The IAS data merger 95 interleaves the data units from these two data streams according to the method of the present invention, and consequently produces the output data stream 96 along with clock out 97. This single data stream then gets processed by the image processing system 98, which results in the composite output image 99.

Figure 11:
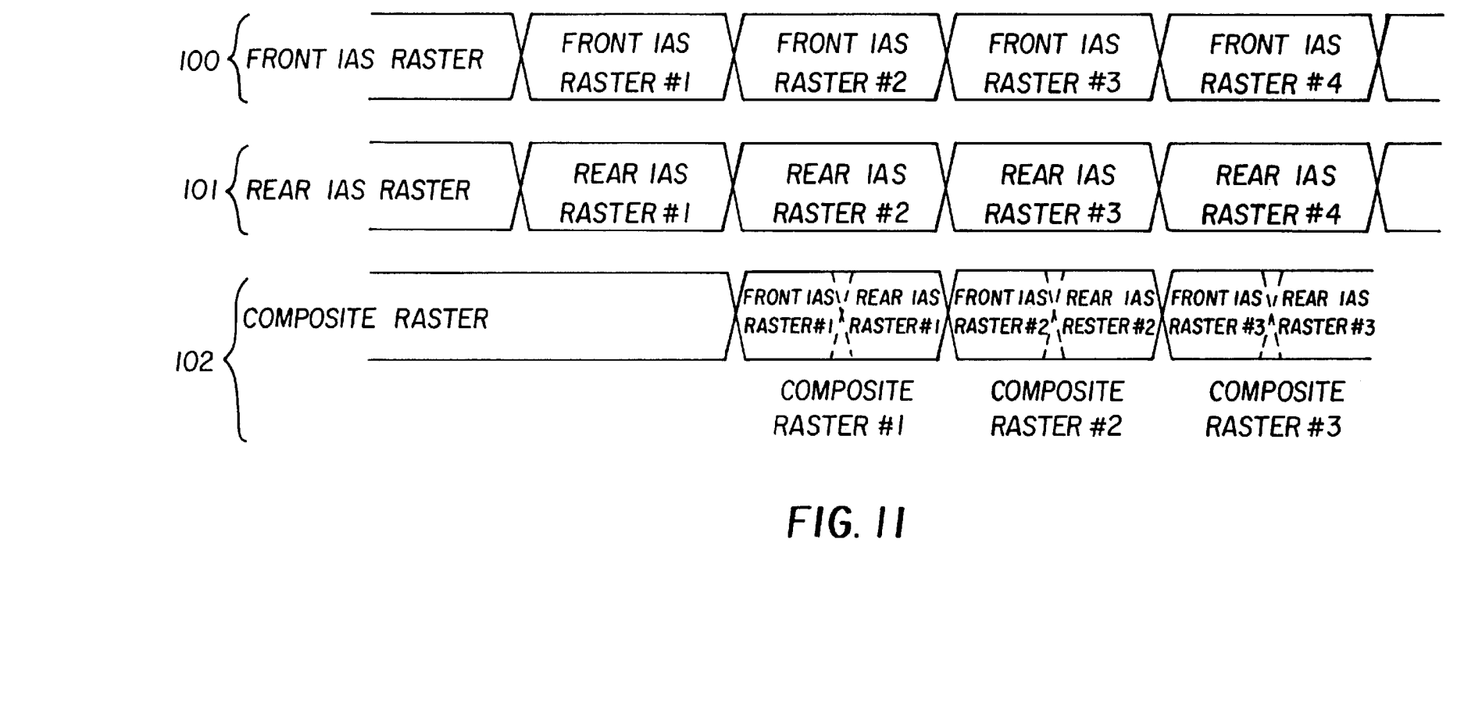
FIG. 11 illustrates the relationship between the input data from two asynchronous data sources and the resultant output data stream of interleaved data, according to one embodiment of the present invention.

FIG. 11 shows the relationship between the input data 100 from the front IAS, the input data 101 from the rear IAS and the composite image output data 102. The composite image output data 102 consists of the input data merged according to the present invention.

Figure 12:
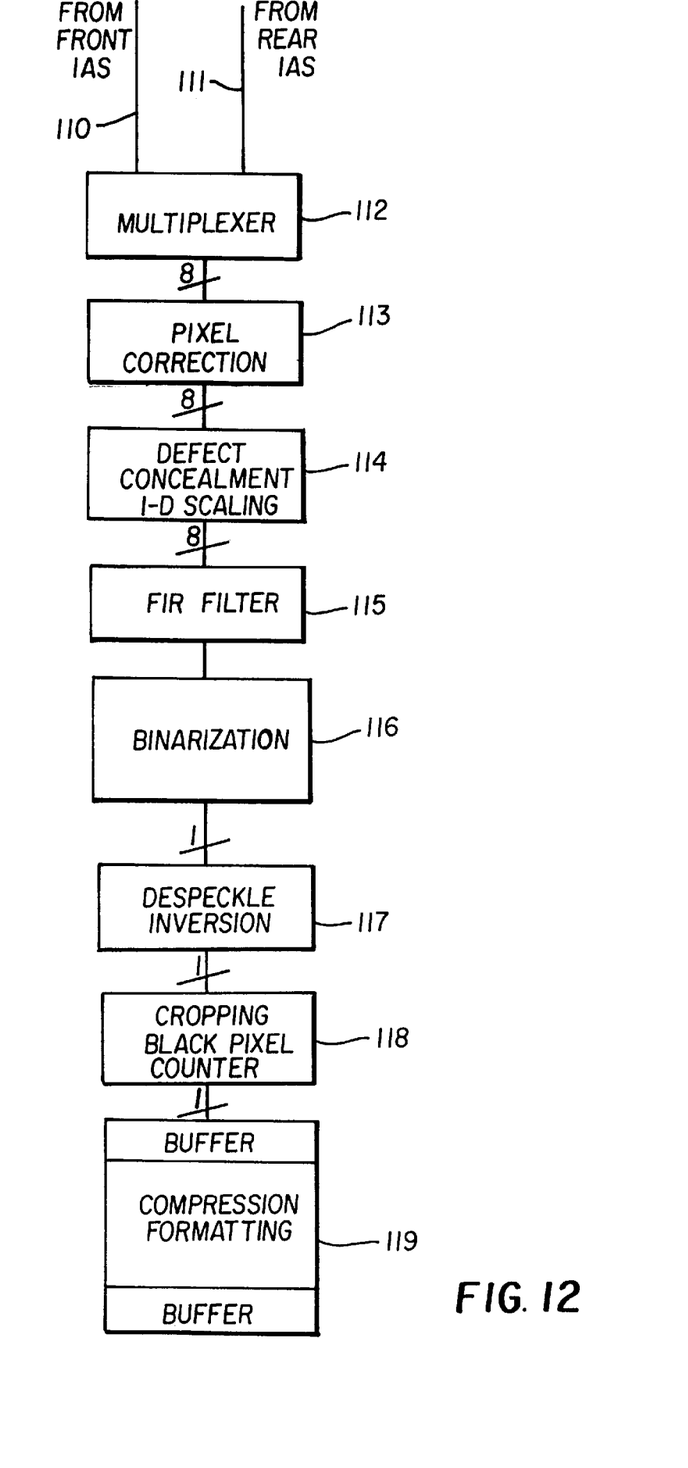
FIG. 12 demonstrates, in the form of a system data path, the reduced processing and increased efficiency which occurs when applying the subject invention to a duplex document scanning operation.

FIG. 12 shows the image processing which occurs on the data from the front IAS and rear IAS in the preferred embodiment. It further demonstrates the savings which result when employing the method set forth in the present invention. Once the input from the front IAS 110 and from the rear IAS 111 has been merged according to the method of the present invention by the multiplexer 112, the composite image data can then be processed by a single image processor.

This could, by way of example only and according to the preferred embodiment, consist of pixel correction 113; pixel defect concealment and one dimensional scaling 114; finite impulse response (FIR) filtering 115; binarization 116; despeckling and inversion 117; cropping and black pixel detection 118; and compression and formatting 119.

In the preferred embodiment of the present invention, pixel correction is used to compensate for pixel-to-pixel variations, and lens and lamp fall-off, which are the inconsistencies in the light distribution introduced by the optics. 1-D Scaling performs 1:1 (300 DPI) or 3:2 (200 DPI) scaling in the fast scan direction. The slow scan direction is scaled by the transport speed. Pixel defect concealment is used to detect and mask single pixel defects in the CCD.

Several methods are possible, with the simplest being pixel replication. Bilinear interpolation is another method. The FIR Filter function is used to enhance the gray-scale image prior to binarization. Depending on the type of enhancement desired (lowpass, bandpass, or highpass), a FIR filter can be implemented to help reduce noise and aliasing effects. IIR filters may also be implemented.

Binarization is used to convert gray-scale image data to binary image data. There are several types of binarization techniques that can be applied to an image. Some techniques include dynamic thresholding (refer to U.S. Pat. No. 5,583, 659), dithering, error diffusion, and fixed thresholding. In the preferred embodiment, dynamic thresholding, dithering, or fixed thresholding may be applied to the image. Also in the preferred embodiment, the front and rear images can be independently located in the composite image and have different binarization techniques applied to them. Despeckling is used to remove any single pixel noise in the image. Inversion is used to convert black pixels to white and vice versa. Cropping cuts the image to a predefined size. If the document scanned is shorter than the cropping parameters specify, the image is cropped to the document length. The black pixel counter is a function which aids in the detection of blank images (e.g. a blank sheet of paper). It calculates the total number of black pixels in the document and reports the results back to the system controller. The system controller can then use this information in conjunction with image dimensions to determine the black (or white) content of a document. If the system controller determines that the page is blank, the system controller can remove it from its queue. This function is also useful in detecting dead lamps. Compression reduces the binary image data using CCITT group 3, CCITT group 3-2D, CCITT group 4, and JBIG compression standards. Certainly, other compression techniques could also be employed. Formatting orders the pixels in little endian or big endian mode.

The invention has been described in detail with particular reference to the preferred embodiment thereof, but it will be understood that variations and modifications can be effected within the spirit and scope of the invention as described hereinabove and as defined in the appended claims. By way of example only, various other imaging algorithms could be employed and still be within the spirit and scope of this invention. It should also be recognized by those skilled in the art that a microprocessor operating under software control and implementing the above invention would be one such variation within the spirit and scope of the invention.

PARTS LIST

| Part number | Description |
| --- | --- |
| 10 | data processing system |
| 11 | data store one |
| 12 | data store two |
| 13 | data merger |
| 14 | data bus one |
| 15 | databus two |
| 16 | output data |
| 17 | input clock one |
| 18 | input clock two |
| 19 | output clock |
| 22 | valid one |
| 23 | valid two |
| 24 | count one |
| 25 | count two |
| 30 | data storage unit one |
| 31 | counter one |

-continued

PARTS LIST

| Part number | Description |
|---|---|
| 32 | data storage unit two |
| 33 | counter two |
| 41 | threshold one |
| 42 | threshold two |
| 43 | threshold one exceeded |
| 44 | event counter |
| 45 | threshold two exceeded |
| 46 | control logic |
| 47 | merge enable |
| 48 | merge data mux |
| 50 | threshold compare one |
| 51 | threshold compare two |
| 52 | event status |
| 62 | first condition check: event count equal AND both thresholds exceeded |
| 63 | second condition check: event count greater than midpoint AND second threshold exceeded |
| 64 | third condition check: event count less than midpoint AND first threshold exceeded |
| 65 | data merge enable |
| 70 | front image |
| 71 | rear image |
| 72 | composite image |
| 81 | image acquisition system (IAS) one |
| 82 | IAS two |
| 83 | IAS clock one |
| 84 | IAS data one |
| 85 | IAS clock two |
| 86 | IAS data two |
| 87 | IAS valid one |
| 88 | IAS valid two |
| 89 | data store one |
| 90 | data store two |
| 91 | data bus one |
| 92 | count one |
| 93 | data bus two |
| 94 | count two |
| 95 | data merge unit |
| 96 | IAS output data |
| 97 | clock out |
| 98 | image processing |
| 99 | composite output image |
| 100 | front IAS raster |
| 101 | rear IAS raster |
| 102 | composite raster |
| 105 | image one |
| 106 | image two |
| 110 | front IAS input |
| 111 | rear IAS input |
| 112 | multiplexer |
| 113 | pixel correction |
| 114 | defect concealment and 1-D scaling |
| 115 | FIR filter |
| 116 | binarization |
| 117 | despeckling and inversion |
| 118 | cropping and black pixel counter |
| 119 | compression formatting |
| 130 | aperture one |
| 131 | document feeder module |
| 132 | aperture two |
| 133 | transport driver |
| 134 | image path |
| 135 | transport idler |
| 137 | paper path |
| 138 | lens assembly one |
| 140 | lens assembly two |
| 142 | camera/CCD module one |
| 144 | camera/CCD module two |
| 150 | mirror one |
| 152 | mirror two |

What is claimed is:

1. The method for continuous synchronization of a plurality of independently clocked asynchronous data sources comprising the steps of:

a) acquiring available data units from a plurality of data sources;

b) determining a total number of received data units from each source;

c) comparing said totals to a set of thresholds;

d) transferring said acquired data units to a composite output when said totals meet the criteria established by said thresholds;

e) repeating steps a-d until all data units have been acquired from said data sources;

wherein an event counter which monitors the relative availability of data to be merged into the composite output stream;

wherein the event counter in a two channel system counts up upon the arrival of a valid line pulse from the first data source and counts down upon the arrival of a valid line pulse from the second data source; and wherein the event counter is further defined as being preset to the midpoint of its range.

2. An apparatus for continuous synchronization of a pair of independently clocked asynchronous data streams consisting of raster data from independent imaging acquisition systems comprising:

a) a means for acquiring individual rasters from a first stream of data;

b) a means for counting a first total number of received rasters;

c) a means for comparing said first total to a first threshold;

d) a means for acquiring individual rasters from a second stream of data;

e) a means for counting a second total number of received rasters;

f) a means for comparing said second total to a second threshold; and g) a means for transferring said first acquired data stream and said second acquired data stream to a composite output when said first total is greater than said first threshold and said second total is greater than said second threshold.

3. The apparatus according to claim 2, wherein the data acquisition means for the data units is further defined as being a first-in, first-out (FIFO) buffer means.

4. The apparatus according to claim 2, wherein the threshold comparison means compares the number of data units received by the data source to a predetermined maximum number of data units.

5. The apparatus according to claim 2, wherein the composite output is further defined to be the interleaving of the data received by the data sources.

6. The apparatus according to claim 2, further defined to include an event counter means which monitors the relative availability of data to be merged into the composite output stream.

7. The apparatus according to claim 2, wherein the means for transferring said input data streams to a composite output stream gets clocked at a constant rate.

8. The apparatus according to claim 2 wherein the data units to be interleaved comprise pixel data.

9. The apparatus according to claim 2 wherein the data units to be interleaved comprise document data.

10. The apparatus according to claim 3 wherein the data units to be interleaved comprise pixel data.

11. The apparatus according to claim 3 wherein the data units to be interleaved comprise document data.

12. The apparatus according to claim 4 wherein the data units to be interleaved comprise pixel data.

13. The apparatus according to claim 4 wherein the data units to be interleaved comprise document data.

14. The apparatus according to claim 5 wherein the data units to be interleaved comprise pixel data.

15. The apparatus according to claim 5 wherein the data units to be interleaved comprise document data.

16. The apparatus according to claim 6, wherein the event counter means in a two channel system counts up upon the arrival of a valid line pulse on the first channel and counts down upon the arrival of a valid line pulse on the second channel.

17. The apparatus according to claim 6 wherein the data units to be interleaved comprise pixel data.

18. The apparatus according to claim 6 wherein the data units to be interleaved comprise document data.

19. The apparatus according to claim 7 wherein the data units to be interleaved comprise pixel data.

20. The apparatus according to claim 7 wherein the data units to be interleaved comprise document data.

21. The apparatus according to claim 16, wherein the event counter means is further defined as being preset to the midpoint of its range.

22. The apparatus according to claim 16 wherein the data units to be interleaved comprise pixel data.

23. The apparatus according to claim 16 wherein the data units to be interleaved comprise document data.

* * * * *